(12) United States Patent
Zhang et al.

(10) Patent No.: US 10,648,924 B2
(45) Date of Patent: May 12, 2020

(54) GENERATING HIGH RESOLUTION IMAGES FROM LOW RESOLUTION IMAGES FOR SEMICONDUCTOR APPLICATIONS

(71) Applicant: KLA-Tencor Corporation, Milpitas, CA (US)

(72) Inventors: Jing Zhang, Santa Clara, CA (US); Grace Hsiu-Ling Chen, Los Gatos, CA (US); Kris Bhaskar, San Jose, CA (US); Keith Wells, Santa Cruz, CA (US); Nan Bai, Fremont, CA (US); Ping Gu, San Jose, CA (US); Lisheng Gao, Saratoga, CA (US)

(73) Assignee: KLA-Tencor Corp., Milpitas, CA (US)

( * ) Notice: Subject to any disclaimer, the term of this patent is extended or adjusted under 35 U.S.C. 154(b) by 238 days.

(21) Appl. No.: 15/396,800

(22) Filed: Jan. 2, 2017

(65) Prior Publication Data
US 2017/0193680 A1    Jul. 6, 2017

Related U.S. Application Data

(60) Provisional application No. 62/274,731, filed on Jan. 4, 2016.

(51) Int. Cl.
*G01N 21/95*    (2006.01)
*G06K 9/68*    (2006.01)
(Continued)

(52) U.S. Cl.
CPC ....... *G01N 21/9501* (2013.01); *G06K 9/4628* (2013.01); *G06K 9/6273* (2013.01);
(Continued)

(58) Field of Classification Search
CPC .......... G01N 21/9501; G01N 2201/12; G06K 9/4628; G06K 9/6273; G06K 9/6857; G06K 2209/19; G06T 3/4053
See application file for complete search history.

(56) References Cited

U.S. PATENT DOCUMENTS 5,808,589 A * 9/1998 Fergason ........... G02B 27/0172
345/8
6,770,879 B1 * 8/2004 Azordegan ............. H01J 37/22
250/307

(Continued)

OTHER PUBLICATIONS

Capel, David, and Andrew Zisserman. "Super-resolution from multiple views using learnt image models." null. IEEE, 2001. 9 pages (Year: 2001).*

(Continued)

*Primary Examiner* — Manav Seth
(74) *Attorney, Agent, or Firm* — Ann Marie Mewherter

(57) ABSTRACT

Methods and systems for generating a high resolution image for a specimen from one or more low resolution images of the specimen are provided. One system includes one or more computer subsystems configured for acquiring one or more low resolution images of a specimen. The system also includes one or more components executed by the one or more computer subsystems. The one or more components include a model that includes one or more first layers configured for generating a representation of the one or more low resolution images. The model also includes one or more second layers configured for generating a high resolution image of the specimen from the representation of the one or more low resolution images.

27 Claims, 6 Drawing Sheets

(51) Int. Cl.
*G06K 9/62* (2006.01)
*G06K 9/46* (2006.01)
*G06T 3/40* (2006.01)

(52) U.S. Cl.
CPC .......... *G06K 9/6857* (2013.01); *G06T 3/4053* (2013.01); *G01N 2201/12* (2013.01); *G06K 2209/19* (2013.01)

(56) References Cited

U.S. PATENT DOCUMENTS

| | | | |
|---|---|---|---|
| 7,365,834 B2* | 4/2008 | Lewis | G01N 21/474 |
| | | | 356/237.2 |
| 7,570,796 B2 | 8/2009 | Zafar et al. | |
| 7,598,492 B1* | 10/2009 | Krzeczowski | H01J 37/222 |
| | | | 250/306 |
| 7,676,077 B2 | 3/2010 | Kulkarni et al. | |
| 7,691,549 B1* | 4/2010 | Glasser | G03F 7/2026 |
| | | | 430/22 |
| 7,769,230 B2* | 8/2010 | Pillman | H04N 9/045 |
| | | | 382/152 |
| 8,068,700 B2* | 11/2011 | Tsunekawa | G06T 3/4007 |
| | | | 382/284 |
| 8,126,255 B2 | 2/2012 | Bhaskar et al. | |
| 8,179,445 B2* | 5/2012 | Hao | H04N 5/23248 |
| | | | 348/208.13 |
| 8,442,355 B2* | 5/2013 | Imai | G06T 3/4061 |
| | | | 345/419 |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,704,196 B2* | 4/2014 | Wolleschensky | G02B 21/367 |
| | | | 250/458.1 |
| 8,716,662 B1 | 5/2014 | MacDonald et al. | |
| 9,222,895 B2 | 12/2015 | Duffy et al. | |
| 9,679,360 B2* | 6/2017 | Fleischer | G06T 3/4061 |
| 9,892,812 B2* | 2/2018 | Zheng | G21K 7/00 |
| 9,955,071 B2* | 4/2018 | Deever | G06T 3/4076 |
| 10,043,261 B2* | 8/2018 | Bhaskar | G03F 1/86 |
| 2003/0086081 A1* | 5/2003 | Lehman | G01N 21/95607 |
| | | | 356/237.1 |
| 2007/0019887 A1* | 1/2007 | Nestares | G06T 3/4053 |
| | | | 382/299 |
| 2008/0304056 A1* | 12/2008 | Alles | G03F 1/84 |
| | | | 356/237.5 |
| 2011/0320149 A1* | 12/2011 | Lee | G01N 21/9501 |
| | | | 702/83 |
| 2015/0324965 A1 | 11/2015 | Kulkarni et al. | |
| 2015/0339571 A1 | 11/2015 | Krizhevsky et al. | |
| 2015/0348253 A1 | 12/2015 | Bendall et al. | |
| 2017/0148226 A1 | 5/2017 | Zhang et al. | |
| 2017/0193400 A1 | 7/2017 | Bhaskar et al. | |

OTHER PUBLICATIONS

Osendorfer, Christian, Hubert Soyer, and Patrick Van Der Smagt. "Image super-resolution with fast approximate convolutional sparse coding." International Conference on Neural Information Processing. Springer, Cham, 2014. 8 pages (Year: 2014).*

International Search Report for PCT/US2017/012209 dated Apr. 11, 2017.

U.S. Appl. No. 15/176,139, filed Jun. 7, 2016 by Zhang et al. (submitted as U.S. Patent Application Publication No. 2017/0148226 published May 25, 2017 by Zhang et al.).

Dong et al., "Learning a Deep Convolutional Network for Image Super-Resolution," Computer Vision—ECCV 2014, 12th European Conference, Zurich, Switzerland, Sep. 6-12, 2014, pp. 184-199.

Hand et al., "Principles of Data Mining (Adaptive Computation and Machine Learning)," MIT Press, 2001, 578 pages.

Hatti et al., "Neural Network based DCT Computation," International Journal on Advanced Computer Engineering and Communication Technology, vol. 1, Issue 1, pp. 81-86, 2012.

Jebara, "Discriminative, Generative, and Imitative Learning," Massachusetts Institute of Technology, MIT Thesis, Feb. 2002, 212 pages.

Nakashika et al., "High-Frequency Restoration Using Deep Belief Nets for Super-Resolution," 2013 International Conference on Signal-Image Technology & Internet-Based Systems (SITIS), Dec. 2-5, 2013, pp. 38-42.

Sugiyama, "Introduction to Statistical Machine Learning," Morgan Kaufmann, 2016, 534 pages.

* cited by examiner

GENERATING HIGH RESOLUTION IMAGES FROM LOW RESOLUTION IMAGES FOR SEMICONDUCTOR APPLICATIONS

BACKGROUND OF THE INVENTION

1. Field of the Invention

The present invention generally relates to methods and systems for generating high resolution images from low resolution images for semiconductor applications.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on specimens, metrology processes are used to measure one or more characteristics of the specimens that cannot be determined using currently used inspection tools. For example, metrology processes are used to measure one or more characteristics of specimens such as a dimension (e.g., line width, thickness, etc.) of features formed on the specimens during a process such that the performance of the process can be determined from the one or more characteristics. In addition, if the one or more characteristics of the specimens are unacceptable (e.g., out of a predetermined range for the characteristic(s)), the measurements of the one or more characteristics of the specimens may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on specimens may be independent of the results of an inspection process performed on the specimens. In particular, the locations at which a metrology process is performed may be selected independently of inspection results.

As described above, therefore, due to the limited resolution with which inspection (optical and sometimes electron beam inspection) is performed, the specimen is generally needed to generate additional higher resolution images for defect review of the defects detected on the specimen, which may include verification of the detected defects, classification of the detected defects, and determining characteristics of the defects. In addition, higher resolution images are generally needed to determine information for patterned features formed on the specimen as in metrology regardless of whether defects have been detected in the patterned features. Therefore, defect review and metrology can be time consuming processes that require use of the physical specimen itself and additional tools (in addition to the inspector) needed to generate the higher resolution images.

Defect review and metrology, however, are not processes that can be simply eliminated to save time and money. For example, due to the resolution with which inspection processes are performed, inspection processes do not in general generate image signals or data that can be used to determine information for the detected defects that is sufficient to classify the defects and/or determine a root cause of the defects. In addition, due to the resolution with which inspection processes are performed, inspection processes do not in general generate image signals or data that can be used to determine information for patterned features formed on the specimen with sufficient accuracy.

Accordingly, it would be advantageous to develop systems and methods for generating a high resolution image for a specimen that do not have one or more of the disadvantages described above.

SUMMARY OF THE INVENTION

The following description of various embodiments is not to be construed in any way as limiting the subject matter of the appended claims.

One embodiment relates to a system configured to generate a high resolution image for a specimen from one or more low resolution images of the specimen. The system includes one or more computer subsystems configured for acquiring one or more low resolution images of a specimen. The system also includes one or more components executed by the one or more computer subsystems. The one or more components include a model that includes one or more first layers configured for generating a representation of the one or more low resolution images. The model also includes one or more second layers configured for generating a high resolution image of the specimen from the representation of the one or more low resolution images. The system may be further configured as described herein.

An additional embodiment relates to another system configured to generate resolution image for a specimen from one or more low resolution images of the specimen. This system is configured as described above. This system also includes an imaging subsystem configured for generating the one or more low resolution images of the specimen. The computer subsystem(s) are, in this embodiment, configured for acquiring the one or more low resolution images from the imaging subsystem. This embodiment of the system may be further configured as described herein.

Another embodiment relates to a computer-implemented method for generating a high resolution image for a specimen from one or more low resolution images of the specimen. The method includes acquiring one or more low resolution images of a specimen. The method also includes generating a representation of the one or more low resolution images by inputting the one or more low resolution images into one or more first layers of a model. In addition, the method includes generating a high resolution image for the specimen based on the representation. Generating the high resolution image is performed by one or more second layers of the model. The acquiring, generating the representation, and generating the high resolution image steps are performed by one or more computer systems. One or more components are executed by the one or more computer systems, and the one or more components include the model.

Each of the steps of the method described above may be further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on one or more computer systems for performing a computer-implemented method for generating a high resolution image for a specimen from one or more low resolutions images of the specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
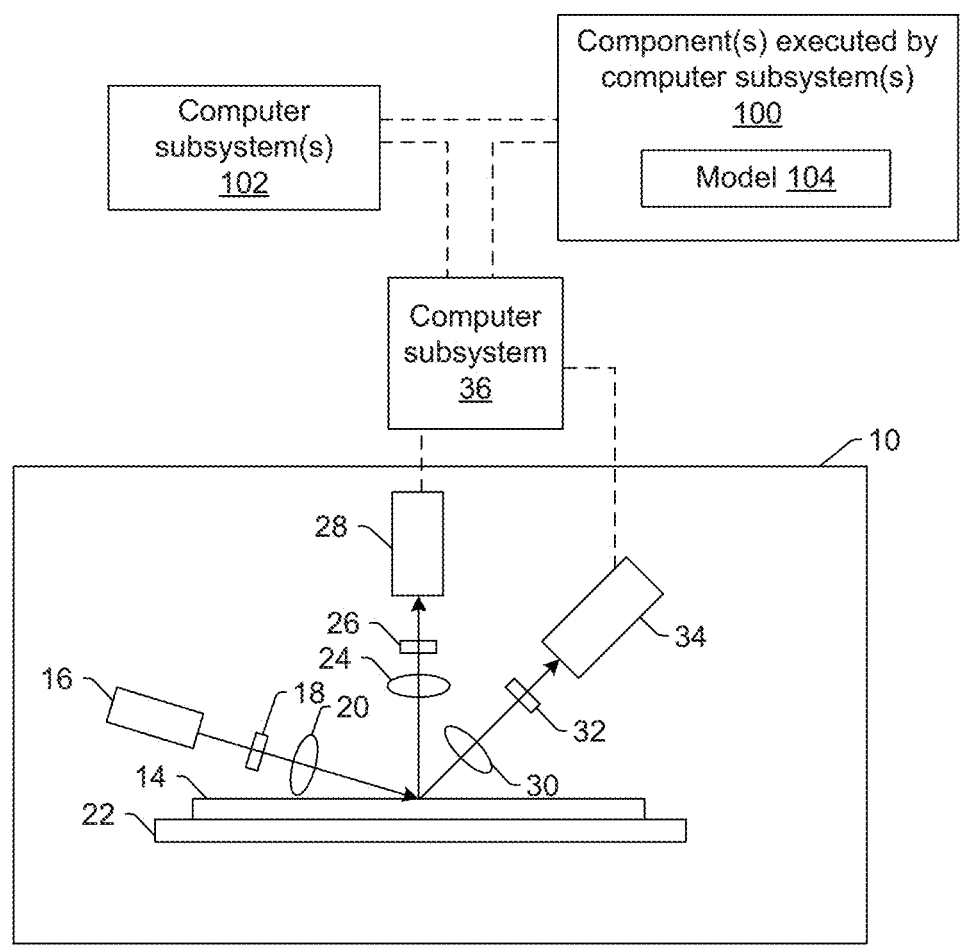
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The tennis "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to generate a high resolution image for a specimen from one or more low resolution images of the specimen. The term "low resolution image" of a specimen, as used herein, is generally defined as an image in which all of the patterned features formed in the area of the specimen at which the image was generated are not resolved in the image. For example, some of the patterned features in the area of the specimen at which a low resolution image was generated may be resolved in the low resolution image if their size is large enough to render them resolvable. However, the low resolution image is not generated at a resolution that renders all patterned features in the image resolvable. In this manner, a "low resolution image," as that term is used herein, does not contain information about patterned features on the specimen that is sufficient for the low resolution image to be used for applications such as defect review, which may include defect classification and/or verification, and metrology. In addition, a "low resolution image" as that term is used herein generally refers to images generated by inspection systems, which typically have relatively lower resolution (e.g., lower than defect review and/or metrology systems) in order to have relatively fast throughput.

The "low resolution images" may also be "low resolution" in that they have a lower resolution than a "high resolution image" described herein. A "high resolution image" as that term is used herein can be generally defined as an image in which all patterned features of the specimen are resolved with relatively high accuracy. In this manner, all of the patterned features in the area of the specimen for which a high resolution image is generated are resolved in the high resolution image regardless of their size. As such, a "high resolution image," as that term is used herein, contains information about patterned features of the specimen that is sufficient for the high resolution image to be used for applications such as defect review, which may include defect classification and/or verification, and metrology. In addition, a "high resolution image" as that term is used herein generally refers to images that cannot be generated by inspection systems during routine operation, which are configured to sacrifice resolution capability for increased throughput.

As described further herein, the one or more low resolution images may include, for example, optical images of the specimen, and the high resolution image may include an electron beam image (e.g., a scanning electron microscope (SEM) image) or design data for the specimen. In addition, as described further herein, generating the high resolution image for the specimen may be performed with a model such as a deep learning model. Therefore, as described further herein, the embodiments may be configured for performing optical to SEM and/or design data transformation(s) using a deep learning technique.

In contrast to the embodiments described herein, physics based approaches for performing a low resolution to high resolution transformation require information that generally is not readily available (such as optical constants of materials used in semiconductor fabrication processes, accurate stack information, etc.) and are too computationally intensive to be a realistic solution for yield control related processes. In particular, existing methods invert optical images to electro-magnetic field solution by solving interaction of light to the semiconductor layout. This method requires optical constants of material, device layout, and precise system response. All three are usually not readily available. In addition, these methods are computationally extensive. Hence, it is not possible to scale the transformation to the full wafer level.

Transformations in the other direction, i.e., from design to optical or SEM to optical using basic optical formation methods, have been in use. Such transformations may be used for semiconductor applications such as die-to-database inspection and optical critical dimension (CD) metrology measurements.

Transformation from low resolution image(s) to high resolution image(s) using a deep learning technique is new. The recent advances of deep learning utilizing advanced neural networks open the door for low resolution to high resolution image transformation. For example, some currently used applications of neural networks are image deconvolution and super resolution image reconstruction. The published techniques are used for photographic images, and none of the published work is known to be applied to semiconductor applications. The embodiments described herein take advantage of these advances to use deep learning and/or machine learning techniques for low resolution to high resolution image transformation. To boost the transformation robustness, the embodiments described herein may use multi-mode low resolution images (such as through focus, across spectral bands, or across different polarizations) so that additional low resolution image information is used in conjunction to boost the low resolution image data content that is available for transformation.

In addition, none of the models described herein is known to have been configured or used for transforming a low resolution image of one type to a high resolution image of a different type. In particular, the models described herein are believed to have been only applied to situations in which a photographic image resolution is enhanced, but not transformed from one imaging technique to another. For example, in previously used methods and systems, the low resolution photographic image is not generated using one photographic technique while the high resolution photographic image corresponds to an image that would be generated with another photographic technique. In contrast, the embodiments described herein may use the models described further herein to transform a low resolution optical image to a high resolution electron beam image and/or a high resolution design data representation of the specimen. Therefore, the resolution of the specimen representation changes as well as the representation mode. In this manner, the low and high resolution images may have different image types. However, in other instances, the low resolution image and the high resolution image may have the same image type (e.g., as when a low resolution electron beam image is transformed into a high resolution electron beam image).

One embodiment of a system configured to generate a high resolution image for a specimen from one or more low resolution images of the specimen is shown in FIG. 1. The system includes one or more computer subsystems (e.g., computer subsystem 36 and computer subsystem(s) 102) and one or more components 100 executed by the one or more computer subsystems. In some embodiments, the system includes imaging system (or subsystem) 10. In the embodiment of FIG. 1, the imaging system is configured for scanning light over or directing light to a physical version of the specimen while detecting light from the specimen to thereby generate the images for the specimen. The imaging system may also be configured to perform the scanning (or directing) and the detecting with multiple modes.

In one embodiment, the specimen is a wafer. The wafer may include any wafer known in the art. In another embodiment, the specimen is a reticle. The reticle may include arty reticle known in the art.

In one embodiment, the imaging system is an optical based imaging system. In one such example, in the embodiment of the system shown in FIG. 1, optical based imaging system 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging system may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different oblique angle of incidence or a normal (or near normal) angle of incidence.

In some instances, the imaging system may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one tight source (e.g., source 16 shown in FIG. 1) and light from the tight source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging system may be configured to alter one or more of the elements of the illumination subsystem based on the type of illumination to be used for imaging.

The imaging system may also include a scanning subsystem configured to cause the light to be scanned over the specimen. For example, the imaging system may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the imaging system may be configured such that one or more optical elements of the imaging system perform some scanning of the light over the specimen. The light may be scanned over the specimen in any suitable fashion such as in a serpentine-like path or in a spiral path.

The imaging system further includes one or more detection channels. At least one of the one or more detection channels includes a detector configured to detect light from the specimen due to illumination of the specimen by the system and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging system that includes two detection channels, the imaging system may include a different number of detection channels (e.g., only one detection channel or two or more detection channels). In one such instance, the detection channel formed by collector 30, element 32, and detector 34 may form one side channel as described above, and the imaging system may include an additional detection channel (not shown) formed as another side channel that is positioned on the opposite side of the plane of incidence. Therefore, the imaging system may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging system may also include two or more side channels configured as described above. As such, the imaging system may include at least three channels (i.e., one top channel and two side channels), and each of the at least three channels has its own collector, each of which is configured to collect light at different scattering angles than each of the other collectors.

As described further above, each of the detection channels included in the imaging system may be configured to detect scattered light. Therefore, the imaging system shown in FIG. 1 may be configured for dark field (DF) imaging of specimens. However, the imaging system may also or alternatively include detection channel(s) that are configured for bright field (BF) imaging of specimens. In other words, the imaging system may include at least one detection channel that is configured to detect light specularly reflected from the specimen. Therefore, the imaging systems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging system may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate image signals or image data. Therefore, the imaging system may be configured to generate the images described herein in a number of ways.

It is noted that FIG. 1 is provided herein to generally illustrate a configuration of an imaging system or subsystem that may be included in the system embodiments described herein or that may generate images that are used by the system embodiments described herein. Obviously, the imaging system configuration described herein may be altered to optimize the performance of the imaging system as is normally performed when designing a commercial imaging system. In addition, the systems described herein may be implemented using an existing system (e.g., by adding functionality described herein to an existing system) such as the 29xx/39xx and Puma 9xxx series of tools that are commercially available from KLA-Tencor, Milpitas, Calif. For some such systems, the embodiments described herein may be provided as optional functionality of the system (e.g., in addition to other functionality of the system). Alternatively, the imaging system described herein may be designed "from scratch" to provide a completely new imaging system.

Computer subsystem 36 of the imaging system may be coupled to the detectors of the imaging system in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions described further herein using the output of the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Figure 1A:
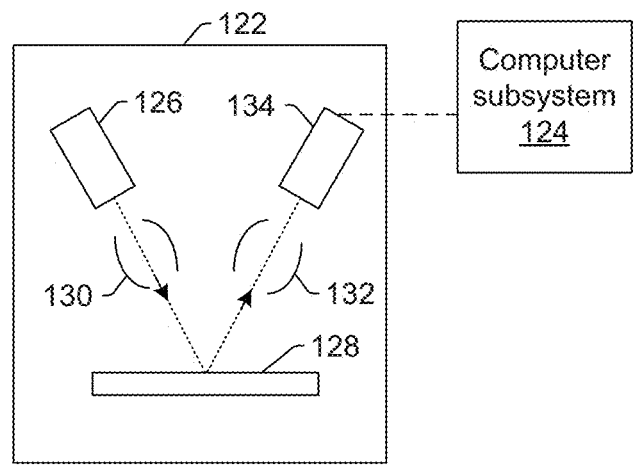

Although the imaging system is described above as being an optical or light-based imaging system, the imaging system may be an electron beam based imaging system. In one such embodiment shown in FIG. 1a, the imaging system includes electron column 122 coupled to computer subsystem 124. As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based imaging system may be configured to use multiple modes to generate images of the specimen as described further herein (e.g., with different illumination angles, collection angles, etc.). The multiple modes of the electron beam based imaging system may be different in any image generation parameters of the imaging system.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output generated by detector 134. Computer subsystem 124 may be configured to perform any additional step(s) described herein. A system that includes the imaging system shown in FIG. 1a may be further configured as described herein.

It is noted that FIG. 1a is provided herein to generally illustrate a configuration of an electron beam based imaging system that may be included in the embodiments described herein. As with the optical based imaging system described above, the electron beam based imaging system configuration described herein may be altered to optimize the performance of the imaging system as is normally performed when designing a commercial imaging system. In addition, the systems described herein may be implemented using an existing system (e.g., by adding functionality described herein to an existing system) such as the eSxxx and eDR-xxxx series of tools that are commercially available from KLA-Tencor. For some such systems, the embodiments described herein may be provided as optional functionality of the system (e.g., in addition to other functionality of the system). Alternatively, the system described herein may be designed "from scratch" to provide a completely new system.

Figure 2:
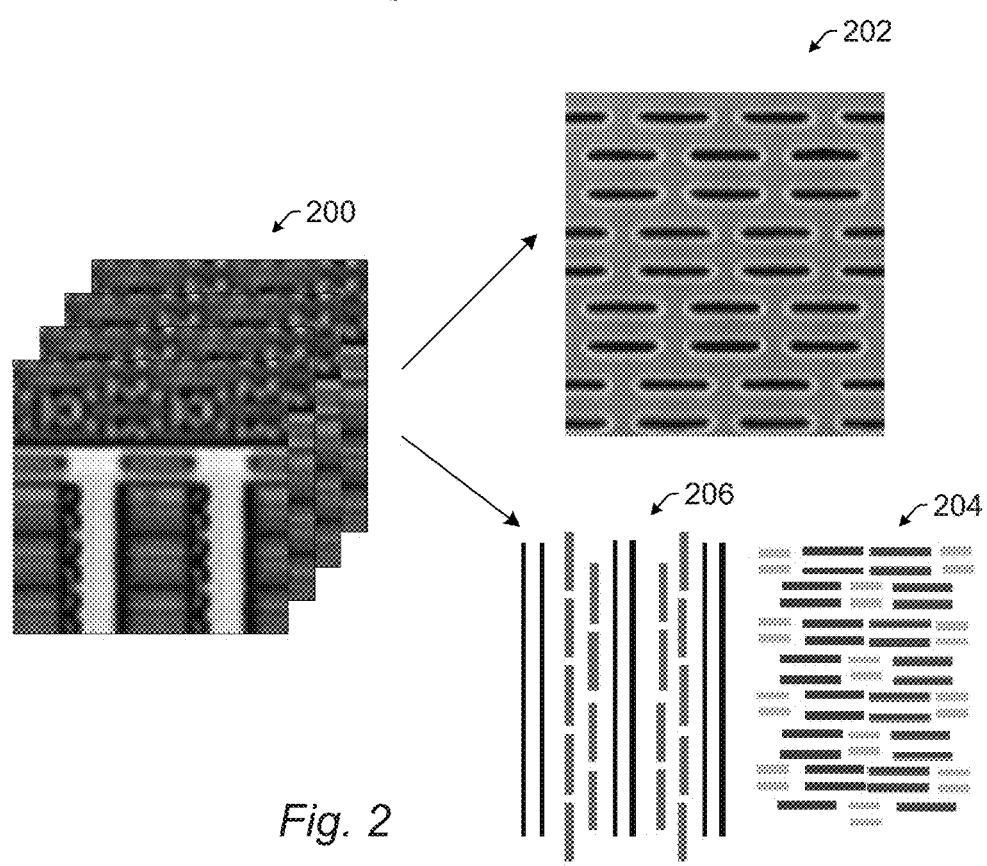
FIG. 2 is a schematic diagram illustrating one example of low resolution images that may be input to the models described herein and high resolution images that may be generated by the models described herein.

Although the imaging system is described above as being an optical based or electron beam based imaging system, the imaging system may be an ion beam based imaging system. Such an imaging system may be configured as shown in FIG. 2 except that the electron beam source may be replaced with any suitable ion beam source known in the art. In addition, the imaging system may be any other suitable ion beam based imaging system such as those included in commercially available focused ion beam (FIB) systems, helium ion microscopy (HIM) systems, and secondary ion mass spectroscopy (SIMS) systems.

As noted above, the imaging system is configured for scanning energy (e.g., light or electrons) over a physical version of the specimen thereby generating actual images for the physical version of the specimen. In this manner, the imaging system may be configured as an "actual" system, rather than a "virtual" system. For example, a storage medium (not shown) and computer subsystem(s) 102 shown in FIG. 1 may be configured as a "virtual" system. In particular, the storage medium and the computer subsystem(s) are not part of imaging system 10 and do not have any capability for handling the physical version of the specimen. In other words, in systems configured as virtual systems, the output of its one or more "detectors" may be output that was previously generated by one or more detectors of an actual system and that is stored in the virtual system, and during the "scanning," the virtual system may replay the stored output as though the specimen is being scanned. In this manner, scanning the specimen with a virtual system may appear to be the same as though a physical specimen is being scanned with an actual system, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents. In addition, configuring the one or more virtual systems as a central compute and storage (CCS) system may be performed as described in the above-referenced patent to Duffy. The persistent storage mechanisms described herein can have distributed computing and storage such as the CCS architecture, but the embodiments described herein are not limited to that architecture.

As further noted above, the imaging system may be configured to generate images of the specimen with multiple modes. In general, a "mode" can be defined by the values of parameters of the imaging system used for generating images of a specimen or the output used to generate images of the specimen. Therefore, modes that are different may be different in the values for at least one of the imaging parameters of the imaging system. For example, in one embodiment of an optical based imaging system, at least one of the multiple modes uses at least one wavelength of light for illumination that is different from at least one wavelength of the light for illumination used for at least one other of the multiple modes. The triodes may be different in the illumination wavelength as described further herein (e.g., by using different light sources, different spectral filters, etc.) for different modes. In another embodiment, at least one of the multiple triodes uses an illumination channel of the imaging system that is different from an illumination channel of the imaging system used for at least one other of the multiple modes. For example, as noted above, the imaging system may include more than one illumination channel. As such, different illumination channels may be used for different modes.

In one embodiment, the imaging system is an inspection system. For example, the optical and electron beam imaging systems described herein may be configured as inspection systems. In another embodiment, the imaging system is a defect review system. For example, the optical and electron beam imaging systems described herein may be configured as defect review systems. In a further embodiment, the imaging system is a metrology system. For example, the optical and electron beam imaging systems described herein may be configured as metrology systems. In particular, the embodiments of the imaging systems described herein and shown in FIGS. 1 and 1a may be modified in one or more parameters to provide different imaging capability depending on the application for which they will be used. In one such example, the imaging system shown in FIG. 1 may be configured to have a higher resolution if it is to be used for defect review or metrology rather than for inspection. In other words, the embodiments of the imaging system shown in FIGS. 1 and 1a describe some general and various configurations for an imaging system that can be tailored in a number of manners that will be obvious to one skilled in the art to produce imaging systems having different imaging capabilities that are more or less suitable for different applications.

The one or more computer subsystems are configured for acquiring one or more low resolution images of a specimen. Acquiring the low resolution image(s) may be performed using one of the imaging systems described herein (e.g., by directing light or an electron beam to the specimen and detecting light or an electron beam from the specimen). In this manner, acquiring the low resolution image(s) may be performed using the physical specimen itself and some sort of imaging hardware. However, acquiring the low resolution image(s) does not necessarily include imaging the specimen using imaging hardware. For example, another system and/or method may generate the low resolution image(s) and may store the generated low resolution image(s) in one or more storage media such as a virtual inspection system as described herein or another storage media described herein. Therefore, acquiring the one or more low resolution images may include acquiring the low resolution image(s) from the storage media in which they have been stored.

In some embodiments, the one or more low resolution images are generated by an inspection system. For example, as described herein, the low resolution image(s) may be generated by an inspection system that is configured to have a lower resolution to increase its throughput. The inspection system may be an optical inspection system or an electron beam inspection system. The inspection system may have any configuration described further herein.

In one embodiment, the one or more low resolution images are generated by an electron beam based imaging system. In another embodiment, the one or more low resolution images are generated by an optical based imaging system. For example, the low resolution image(s) may be generated by any of the electron beam based or optical based imaging systems described herein.

In one embodiment, the one or more low resolution images are generated with a single mode of an imaging system. In another embodiment, the one or more low resolution images are generated with multiple modes of an imaging system. For example, the low resolution image(s) that are input to the model as described further herein may include a single low resolution image that is generated with just a single mode of the imaging system. Alternatively, the low resolution image(s) that are input to the model as described further herein may include multiple low resolution images that are generated with multiple modes of the imaging system (e.g., a first image generated with a first mode, a second image generated with a second mode, and so on). The single mode and the multiple modes may include any of the mode(s) described further herein.

In one embodiment, the one or more low resolution images are generated with multiple values for a focus parameter of an imaging system. For example, as described herein, multiple optical images acquired at different values of focus of an optical imaging system may be input to the model described further herein to increase the robustness of the transformation performed by the model using the low resolution images as input. The one or more low resolution images may be generated at the different focus parameter values in any suitable manner (e.g., using an optical imaging system to perform multiple scans of the specimen, each performed with a different value for focus of the imaging system).

In another embodiment, the one or more low resolution images are generated with multiple values for a spectral parameter of an imaging system. For example, as described herein, multiple optical images acquired at different values of illumination and/or detection wavelength(s) of an optical imaging system may be input to the model described further herein to increase the robustness of the transformation performed by the model using the low resolution images as input. The one or more low resolution images may be generated at the different spectral parameter values in any suitable manner (e.g., using an optical imaging system to perform multiple scans of the specimen, each performed with a different value for illumination and/or detection wavelength(s) of the imaging system).

In a further embodiment, the one or more low resolution images are generated with multiple values for a polarization parameter of an imaging system. For example, as described herein, multiple optical images acquired at different values of illumination and/or detection polarization(s) of an optical imaging system may be input to the model described further herein to increase the robustness of the transformation performed by the model using the low resolution images as input. The one or more low resolution images may be generated at the different polarization parameter values in any suitable manner (e.g., using an optical imaging system to perform multiple scans of the specimen, each performed with a different value for illumination and/or detection polarization(s) of the imaging system).

Although some examples of different parameter values that may be used to generate the multiple low resolution images are described above, particularly with respect to optical imaging systems, the multiple low resolution images that are input to the model described further herein to increase the robustness of the transformation performed by the model may include any parameter of the optical imaging system that can have different values of the parameter during imaging of the specimen and any parameter of electron beam imaging systems that can have different values of the parameter during imaging of the specimen. For example, the different values of a parameter of an electron beam imaging system that may be used to generate multiple low resolution images that are input to the model may include one or more parameters of electron source 126, one or more elements 130 and/or 132, and detector 134.

The component(s), e.g., component(s) 100 shown in FIG. 1, executed by the computer subsystem(s), e.g., computer subsystem 36 and/or computer subsystem(s) 102, include model 104. The model includes one or more first layers configured for generating a representation of the one or more low resolution images and one or more second layers configured for generating a high resolution image for the specimen from the representation of the one or more low resolution images. In this manner, the embodiments described herein may use one of the models described herein one or more machine learning techniques) for transforming low resolution images (e.g., optical representation(s)) of a specimen (e.g., semiconductor devices formed on a wafer) to a high resolution image such as a electron beam image (e.g., a SEM image) and/or design layout.

In one such example, as shown in FIG. 2, the model may be configured to transform low resolution optical images 200 acquired for a specimen to SEM image 202 for the specimen and/or design data 204 and/or 206 for the specimen. As shown in FIG. 2, low resolution optical images 200 may include multiple optical images, each taken at a different value of a parameter (e.g., focus, wavelength, polarization) of the imaging system that generated the optical images. Although design data 204 and 206 is shown in FIG. 2 as a graphical representation of the design data, the design data that is generated by the models described herein may have any other suitable format known in the art such as a vector representation of the design data.

In one embodiment, the one or more second layers are configured for generating at least one additional high resolution image of the specimen from the representation of the one or more low resolution images, and the high resolution image and the at least one additional high resolution image represent different images generated for the specimen with different modes of a high resolution imaging system. For example, the models described herein may be configured to generate a single high resolution image that corresponds to a high resolution image that would be generated for the specimen with only a single mode of a high resolution imaging system. However, the models described herein may be configured to generate multiple high resolution images, each of which corresponds to one of multiple high resolution images that would be generated for the specimen with multiple, corresponding modes of a high resolution imaging system a first high resolution image corresponding to a first mode, a second high resolution image corresponding to a second mode, etc.). It is to be noted, however, that for some of the high resolution images described herein, only a single image would be generated (as would be the case with design data that is being simulated from a low resolution image). The high resolution imaging system may include any of the imaging systems described herein that can be configured as described further herein to have a relatively high resolution.

In some embodiments, the high resolution image represents an image of the specimen generated by a high resolution electron beam system. For example, as described further herein, the high resolution image may represent a high resolution electron beam image generated for the specimen by a high resolution electron beam system such as a SEM and/or another electron beam imaging subsystem configured for defect review and/or metrology. The high resolution electron beam system may include any of the electron beam systems described further herein that can be configured as described further herein to have a relatively high resolution.

In another embodiment, the high resolution image represents design data for the specimen. For example, as described further herein, the high resolution image may represent a design layout and/or any other design data described herein for the specimen. The design data that is generated by the model as described herein may include any of the design data described further herein.

In one embodiment, the model is a deep learning model. Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output (and the layers are not made of neurons but it can help to think of it that way), allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

Various deep learning architectures such as deep neural networks, convolutional deep neural networks, deep belief networks and recurrent neural networks have been applied to fields like computer vision, automatic speech recognition, natural language processing, audio recognition and bioinformatics where they have been shown to produce state-of-the-art results on various tasks.

In another embodiment, the model is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that "gives computers the ability to learn without being explicitly programmed." Machine learning explores the study and construction of algorithms that can learn from and make predictions on data—such algorithms overcome following strictly static program instructions by making data driven predictions or decisions, through building a model from sample inputs.

The machine learning described herein may be further performed as described in "Introduction to Statistical Machine Learning," by Sugiyama, Morgan Kaufmann, 2016, 534 pages; "Discriminative, Generative, and Imitative Learning," Jebara, MIT Thesis, 2002, 212 pages; and "Principles of Data Mining (Adaptive Computation and Machine Learning)," Hand et al., MIT Press, 2001, 578 pages; which are incorporated by reference as if fully set forth herein. The embodiments described herein may be further configured as described in these references.

In some embodiments, the model is a generative model. A "generative" model can be generally defined as a model that is probabilistic in nature. In other words, a "generative" model is not one that performs forward simulation or rule-based approaches and, as such, a model of the physics of the processes involved in generating an actual image (for which a simulated image is being generated) is not necessary. Instead, as described further herein, the generative model can be learned (in that its parameters can be learned) based on a suitable training set of data.

In one embodiment, the model is a deep generative model. For example, the model may be configured to have a deep learning architecture in that the model may include multiple layers, which perform a number of algorithms or transformations. The number of layers on one or both sides of the model may vary from that shown in the drawings described herein. For example, the number of layers on the encoder side of the generative model is use case dependent. In addition, the number of layers on the decoder side is use case dependent and may be dependent on the number of layers on the encoder side. In general, the number of layers on one or both sides of the generative model is not significant and is use case dependent. For practical purposes, a suitable range of layers on both sides is from 2 layers to a few tens of layers.

In a further embodiment, the model is a neural network. For example, the model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas Where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In another embodiment, the model is a convolution neural network (CNN). For example, the embodiments described herein can take advantage of deep learning concepts such as a CNN to solve the normally intractable representation conversion problem (e.g., rendering). The model may have any CNN configuration or architecture known in the art.

The embodiments described herein may or may not be configured for training the model that is used to generate a high resolution image from low resolution image(s). For example, another method and/or system may be configured to generate a trained model, which can then be accessed and used by the embodiments described herein.

In general, training the model may include acquiring data (e.g., both low resolution images and high resolution images, which may include any of the low and high resolution images described herein). For example, given a set of predefined inspection modes (where each mode is defined by a combination of spectral, focus, aperture, etc., and where the number of modes may be equal to or greater than 1), one image per mode per region of interest (ROI) may be collected from or using an inspection tool. In a similar manner, given one or more predefined review/inspection modes, which may be defined in any suitable manner, one SEM image per mode per ROI may be collected from or using the SEM tool.

Model training may then be performed, which may include selecting a neural network architecture (e.g., layers and types) such as one of those described further herein. A training, testing, and validation dataset may then be constructed using a list of input tuples and expected output tuples. The input tuples may have the form of (image acquired with mode 1, image acquired with mode 2, . . . , image acquired with mode n). The output tuples can be one of the following: 1) design data; 2) SEM images acquired with one or more selected modes; or 3) design data and SEM images acquired with one or more selected modes. The model, e.g., neural network, may then be trained using the training dataset. A testing dataset may be used to tune the hyper-parameters in the model. The trained model is expected to perform a conversion between low resolution image(s) acquired with the selected input inspection mode(s) to the selected output design data and/or high resolution image(s) acquired with SEM mode(s).

Training the model may be further performed as described in U.S. patent application Ser. No. 15/176,139 by Zhang et al. filed Jun. 7, 2016 and published as U.S. Patent Application Publication No. 2017/0148226 on May 25, 2017, and Ser. No. 15/394,790 by Bhaskar et al. filed Dec. 29, 2016 published as U.S. Patent Application Publication No. 2017/0193400 on Jul. 6, 2017, which are incorporated by reference. The embodiments described herein may be further configured as described in these patent applications.

At runtime, inspection image(s) may be collected for the selected mode(s). One or more of the inspection image(s) may be input to the trained model to predict the desired design data and/or SEM image(s) for different SEM imaging mode(s).

Figure 3:
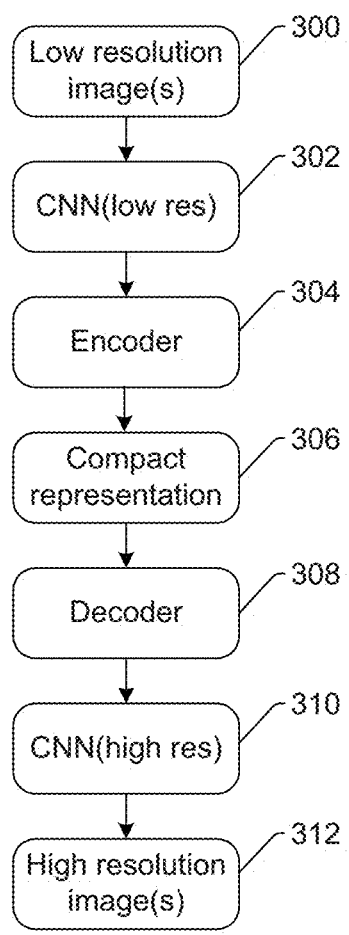
FIGS. 3-5 are flow diagrams illustrating various embodiments of layers that may be included in the models described herein.

In one embodiment, the one or more first layers include one or more convolutional and pooling layers followed by an encoder, and the one or more second layers include a decoder followed by one or more convolutional and pooling layers. In one such embodiment, the representation of the one or more low resolution images generated by the one or more first layers includes a compact representation of the one or more low resolution images. In this manner, the model may be a generative neural net. One such embodiment is shown in FIG. 3.

In this embodiment, the input to the model is low resolution image(s) 300, which may include multiple optical images generated at low resolution and multiple values of a parameter of an optical imaging system as described herein. The parameter may be any of the parameters described herein. Therefore, the low resolution image(s) may be defined as $I_{low\_res}(x, y, i)$, where $I_{low\_res}$ is the pixel value for $i^{th}$ mode at location (x, y). Therefore, $I_{low\_res}(:, :, i)$ can be used to represent the low resolution image for the $i^{th}$ mode. In addition, as noted above, a mode may be defined by a combination of spectral, focus, aperture, etc. parameters of the imaging system used to generate the low resolution image(s). In this manner, if there are 3 spectral parameter values, 2 focus parameter values, and 4 aperture parameter values for which low resolution images may be generated, then the total number of optical modes is 3*2*4=24. Therefore, i may be in the range of 1 to 24. However, low resolution image(s) 300 may include any of the other low resolution images described herein such as a low resolution electron beam image and/or a low resolution image generated with only a single mode of an imaging system.

The low resolution image(s) may be input to CNN(low res) 302, which may include one or more sets of convolutional and pooling layers. The convolutional and pooling layers may have any suitable configuration known in the art. The CNN(low res) is configured for generating features for each of the input low resolution image(s). For example, if multimode images are input to the CNN(low res), then the CNN(low res) may generate multimode features for each of the input low resolution images. The features may include any suitable features known in the art that can be inferred from the input and used to generate the output described further herein. For example, the features may include a vector of intensity values per pixel. The features may also include any other types of features described herein, e.g., vectors of scalar values, vectors of independent distributions, joint distributions, or any other suitable feature types known in the art.

The features determined by the CNN(low res) may be input to encoder 304, which may include one or more encoder layers, configured to generate compact representation 306 for the low resolution image(s). The encoder may be configured as a fully connected layer and can be implemented as a convolutional layer. Therefore, the encoder can be implemented as a relatively small CNN with a few layers. The encoder can also be configured as a plain auto-encoder, a de-noise auto-encoder, a variational auto-encoder, or any other suitable encoder configuration known in the art. The compact representation generated by the encoder may have any suitable configuration and format known in the art.

The model also includes decoder 308, which may include one or more decoder layers, configured to decode compact representation 306 as high resolution features. The decoder may be configured as a fully connected layer and can be implemented as a convolutional layer. Therefore, the decoder can be implemented as a relatively small CNN with a few layers. The high resolution features may include any of the features described herein and any features that can be used to reconstruct one or more high resolution images of the specimen as described further herein.

CNN(high res) 310, which may include one or more sets of convolutional and pooling layers, is configured for generating high resolution image(s) 312 from the output of the decoder. The convolutional and pooling layers included in the CNN(high res) may have any suitable configuration known in the art. The CNN(high res) is configured to use the high resolution features generated by the decoder to generate the high resolution image(s). The one or more simulated high resolution images may include any of the high resolution images described herein. For example, the simulated high resolution image(s) may illustrate how the specimen will appear in high resolution optical image(s) or high resolution electron beam image(s). In this example, the high resolution image(s) may be defined as $I_{high\_res}(x, y, j)$, where $I_{high\_res}$ is the pixel value for the mode at location (x, y). Therefore, $I_{high\_res}(:, :, j)$ can be used to represent the high resolution image for the $j^{th}$ mode. In addition, the simulated high resolution images may represent design data for the specimen. In this example, the high resolution image(s) may be defined as $I_{high\_res}(x, y)$, where $I_{high\_res}$ is the design data value at location (x, y).

The model described herein may, therefore, perform transformations that can be defined as $I_{high\_res}(x, y, j)=T^1[I_{low\_res}(x, y, i)]$ in the case of high resolution images generated for one or more modes j or $I_{high\_res}(x, y)=T^2[I_{low\_res}(x, y, i)]$ in the case of design data, where T[ . . . ] represents the transformation performed by the model.

Each of the layers of the model described above may have one or more parameters such as weights, W, and biases, B, whose values can be determined by training the model, which may be performed as described further herein. For example, the weights and biases of the CNN(low res) layer, the encoder layer, the decoder layer, the CNN(high res) layer, and any other layers included in the model (e.g., a mapping layer) may be determined during training by minimizing a cost function. The cost function may vary depending on the transformation that is being performed on the low resolution images. For example, in the case of transforming the low resolution image(s) to one or more high resolution images generated by a high resolution imaging system, the cost function may be:

$$\min |(T^1[I_{low\_res}(x,y,i)]-I_{high\_res}^{observed}(x,y,j))|^2.$$

In contrast, in the case of transforming the low resolution image(s) to design data for the specimen, the cost function may be defined as:

$$\min |(T^2[I_{low\_res}(x,y,i)]-I_{high\_res}^{observed}(x,y))|^2.$$

The training set may include a set of low resolution images and their corresponding high resolution images. For example, the training set may include $\{I_{low\_res}^{training}(x, y, i)$ and $I_{high\_res}^{training}(x, y, j)\}$. In one such example, the training set may include low resolution optical images and corresponding high resolution electron beam images. In another example, the training set may include $\{I_{low\_res}^{training}(x, y, i)$ and $I_{high\_res}^{training}(x, y)\}$. In one such example, the training set may include low resolution images and corresponding design data.

In some embodiments, the one or more first layers include one or more first convolutional and pooling layers, and the one or more second layers include one or more second convolutional and pooling layers. For example, as described above, the encoder and decoder may be configured as fully connected layers and may be implemented as convolutional layers. Therefore, both the encoder and decoder layers can each be implemented as a relatively small CNN with relatively few layers. Thus, in some implementations, the encoder can be combined with the CNN(low res) as a larger CNN(low res+encoder), and the decoder can be combined with the CNN(high res) as a larger CNN(decoder+high res).

Figure 4:
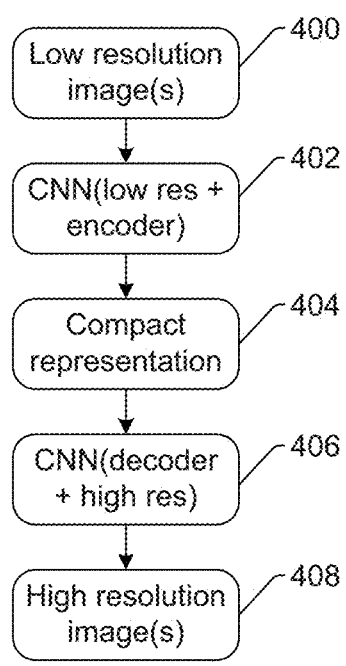

In one such embodiment, as shown in FIG. 4, low resolution image(s) 400, which may include any of the low resolution image(s) described herein, may be input to CNN (low res+encoder) 402, which may include two or more sets of convolutional and pooling layers configured to perform the functions of the CNN(low res) and encoder described above. The convolutional and pooling layers may have any suitable configuration known in the art. The CNN(low res+encoder) 402 may generate compact representation 404, which may be any of the compact representations described further herein. Compact representation 404 may be input to CNN(decoder+high res) 406, which may include two or more sets of convolutional and pooling layers configured to perform the functions of the decoder and CNN(high res) described above. These convolutional and pooling layers may also have any suitable configuration known in the art. The output of the CNN(decoder+high res) 406 may, therefore, be high resolution image(s) 408, which may include any of the high resolution image(s) described herein.

The embodiments of the models described herein that include one or more CNN layers may be further configured as described in "Learning a Deep Convolutional Network for image Super-Resolution," by Dong et al., Computer Vision, ECCV2014, Volume 8692 of the Series Lecture Notes in Computer Science, 2014, 16 pages, which is incorporated by reference as if fully set forth herein.

Figure 5:
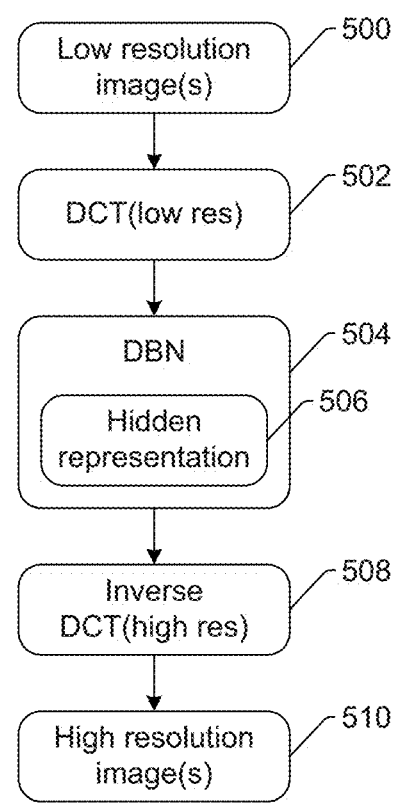

In another embodiment, the one or more first layers include a discrete cosine transform (DCT) layer, the one or more first and second layers include a deep belief net (DBN), and the one or more second layers include an inverse DCT layer. In one such embodiment, the representation of the one or more low resolution images includes a hidden representation generated by the DBN. For example, as shown in FIG. 5, low resolution image(s) 500 may be input to DCT(low res) layer 502, which is included in the one or more first layers. The DCT(low res) layer may be configured to transform the low resolution image into the spatial frequency domain. The DCT(low res) layer may have any suitable configuration known in the art for performing such a transform.

Output of the DCT(low res) layer may be input to DBN 504, which may be included in both the first and second layers. In other words, some layers of the DBN may be included in the first layers and other layers of the DBN may be included in the second layers. The DBN may have any suitable configuration known in the art. DBN 504 generates hidden representation 506. The hidden representation may have any suitable configuration and format known in the art. The DBN inters the missing high frequency components of the low resolution image(s) based on the low resolution image(s) in the spatial frequency domain. For example, an interpolated low resolution image lacks its spatial high frequency components. In this manner, if the high frequency components are restored while allowing the low frequency components to remain, the image may be transformed to a high resolution. Therefore, generating a high resolution image from a low resolution image can be regarded as a completion problem of missing data (i.e., the high frequency components). Output of the DBN may be input to inverse DCT(high res) layer 508, which produces high resolution image(s) 510. For example, inverse DCT(high res) layer 508 may perform an inverse DCT on the output of the DBN to obtain the high resolution image. Inverse DCT(high res) layer 508 may have any suitable configuration known in the art.

A model that is configured as shown in FIG. 5 may be trained in a variety of ways. For example, during training, high resolution images may be partitioned as relatively small patches (e.g., 32 pixels by 32 pixels) and followed by DCT transformation, the DCT coefficients are used as the only inputs to train a DBN, which is a bidirectional hierarchical model. During the training, the DBN learns to transform (1) the high frequency DCT coefficients to the hidden representation and also (2) the hidden representation to the high frequency DCT coefficients. In other words, the DBN learns the bidirectional transformation.

In this manner, during training, one or more parameters such as weights and biases of the layers of the DBN may be determined. The training set may include a set of low resolution images and their corresponding high resolution images. For example, the training set may include $\{I_{low\_res}^{training}(x, y, i)$ and $I_{high\_res}^{training}(x, y, j)\}$. In one such example, the training set may include low resolution optical images and corresponding high resolution electron beam images. In another example, the training set may include $\{I_{low\_res}^{training}(x, y, i)$ and $I_{high\_res}^{training}(x, y)\}$. In one such example, the training set may include low resolution images and corresponding design data.

At runtime, a low resolution image patch may be input to the DCT layer. Because the image patch is a low resolution image, the DCT coefficients for this low resolution image patch will have close to zero values for the coefficients that represents the high frequency domain. This DCT vector is inputted to the DBN to infer the hidden representation and then to use the hidden representation to infer back the DCT coefficients. Because the DBN learns the correlation of DCT coefficients in the low frequency domain and the high frequency domain, the back inference will reconstruct the DCT with information in the high frequency domain.

In this manner, during runtime, the high resolution image(s) may be obtained with only low resolution image(s), $I_{low\_res}(x, y, i)$. Since the network is fully connected, when enough information from DCT layer 502 is given, the high frequency DCT coefficients are bootstrapped with the trained neural network. This high resolution image can then be reconstructed from the bootstrapped high frequency DCT coefficients.

Figure 6:
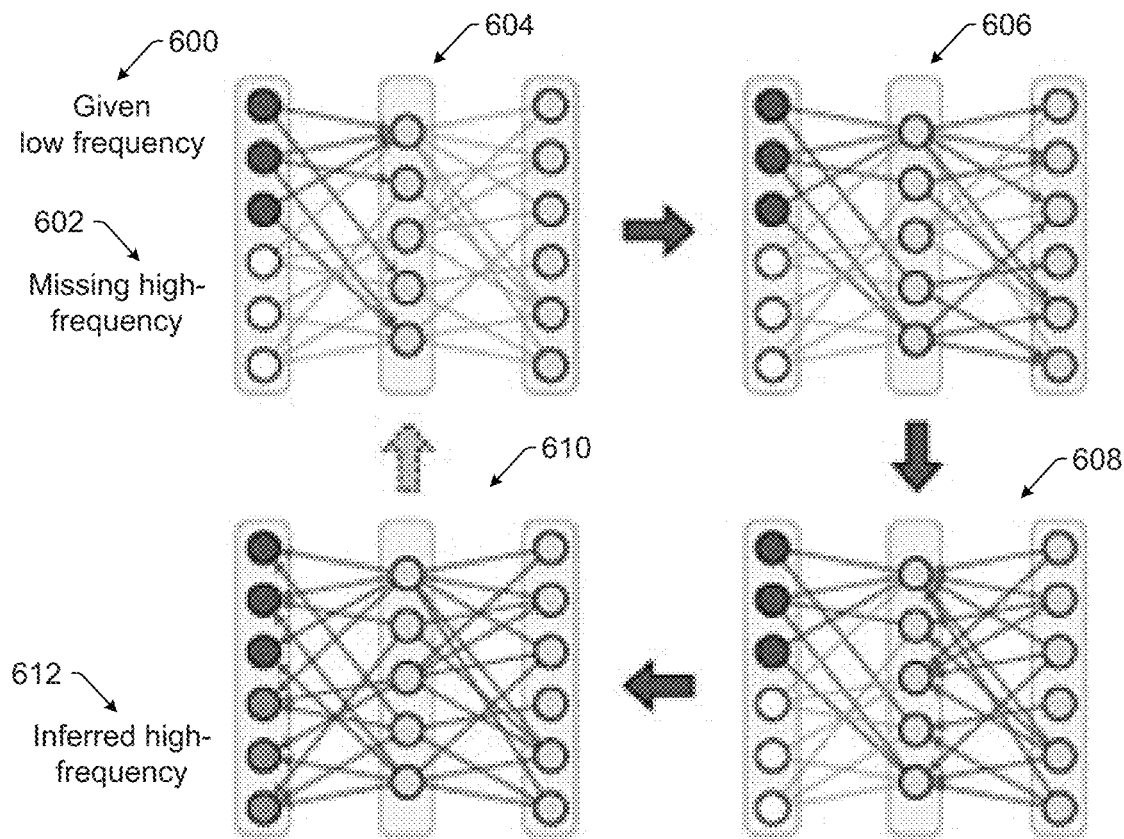
FIG. 6 is a schematic diagram illustrating an embodiment of layers that may be included in the models described herein.

The basic idea of inferring (or restoring) the high frequency components using a DBN is shown in FIG. 6. Given a low resolution interpolated image, DCT low-frequency coefficients 600 are first emphasized to raise the damped parts caused by the interpolation and then fed, with missing high-frequency components 602, into the trained DBN, e.g., into layer 604 of the DBN. The high frequency coefficients are almost zero at this point. Starting with layer 604, the input coefficients may be propagated to layers 606, 608, and 610 and back-propagated through these layers. In this manner, the predicted values including high frequency components 612 can be obtained. In a repetitive approach, the obtained output vector may be input to the DBN again and the same procedure may be repeated a predetermined number of times. As the iterations are performed, the high-frequency components show up gradually without changing the low-frequency components.

Although the embodiment of a DBN is shown in FIG. 6 with 4 layers, 2 of which are hidden (i.e., layers 606 and 608), it is to be understood that the DBN may have any suitable number of layers, which may be application dependent. A model that includes a DBN as described herein may be further configured as described in "Neural Network Based DCT Computation," by Hatti et al., International Journal on Advanced Computer Engineering and Communication Technology, Volume 1, Issue 1, pages 81-86, 2012, and "High-frequency Restoration Using Deep Belief Nets for Super-resolution," by Nakashika et al., 2013 International Conference on Signal-Image Technology & Internet-Based Systems, pp. 38-42, 2013, which are incorporated by reference as if fully set forth herein.

The model described herein may be generated for specific specimens (e.g., specific wafers or reticles), processes, and imaging parameters. In other words, the models described herein may be specimen specific, process specific, and imaging parameter specific. For example, in one embodiment, each model may be trained to be specific to a particular design and wafer layer. The trained model will then only be used to perform predictions for that layer. In this manner, different models may be generated for different wafer layers. However, in another embodiment, a single model may be trained with data from different designs and wafer type layers. The resulting model may be used to perform predictions in general for all types of the specimens included in the training data. In addition, different models may be generated for different sets of imaging parameters (e.g., different imaging modes) used to generate the low resolution image(s), and possibly for different sets of imaging parameters (e.g., different imaging modes) of high resolution images for which the transformations are performed (e.g., in the case of generating multiple high resolution images corresponding to different high resolution imaging modes). In general, a model may be independent of tool as long as the selected imaging modes are repeatable across the tools. Each of the different models may be generated with different training sets of data. Each of the different training sets of data may be generated in any suitable manner.

In some embodiments, the one or more computer subsystems are configured for verifying a defect detected in the one or more low resolution images, and the verifying is performed using the high resolution image. For example, one benefit of the optical image to SEM and/or design transformations described herein is that optical inspection is still the key for high volume production yield in semiconductor manufacturing processes. Due to lack of resolution, defects detected by optical inspectors require SEM review for defect verification. Methods that automatically transform optical to SEM and/or design can potentially reduce SEM review requirements for yield management, thereby reducing total inspection cycle time. For example, the embodiments described herein can eliminate the need for acquiring SEM images on a defect review system after specimen inspection since the high resolution image(s) described herein can be 1) acquired without the specimen and without imaging hardware and 2) used for defect review applications such as defect verification.

In another embodiment, the one or more computer subsystems are configured for classifying a defect detected in the one or more low resolution images, and the classifying is performed using the high resolution image. For example, as described above, one benefit of the optical image to SEM and/or design transformations described herein is that optical inspection is still the key for high volume production yield in semiconductor manufacturing processes. Due to lack of resolution, defects detected by optical inspectors require SEM review for defect classification. Methods that automatically transform optical to SEM and/or design can potentially reduce SEM review requirements for yield management, thereby reducing total inspection cycle time. For example, the embodiments described herein can eliminate the need for acquiring SEM images on a defect review system after specimen inspection since the high resolution image(s) described herein can be 1) acquired without the specimen and without imaging hardware and 2) used for defect review applications such as defect classification.

In a further embodiment, the one or more computer subsystems are configured for detecting defects on the specimen based on a combination of the one or more low resolution images and the high resolution image. For example, one benefit of the optical to SEM and optical to design transformations described herein is that these transformations allow the optical inspector to use the high resolution spatial content for nuisance/defect discrimination across the entire die. In contrast, currently used methods of using spatial information for nuisance/defect discrimination is limited to the hot spot use case. In particular, currently used methods are limited to the hot spot use case primarily due to the fact that the optical defect signals do not have enough saliency against the background noise. Inspecting only pixels that qualify as hot spots allows the system to automatically filter out the majority of pixels on the wafer based on spatial information. Doing so enhances the defect saliency and ultimately improves defect detection. To do so, the system requires someone or a method to identify the important spatial locations for inspection. These locations are then marked as "hot spots" (i.e., the action of identifying spatial location of the inspector turns these locations into "hot spots").

The computer subsystem(s) may be configured to use the combination of one or more low resolution images and one or more high resolution images to detect defects on the specimen in any suitable manner. For example, a position of a defect detected in a low resolution image may be identified in a high resolution image to determine the design context of the defect, which can then be used to determine if the defect is a nuisance defect or an actual defect. In addition, a position of a defect detected in a low resolution image may be used to identify the position of the defect in a high resolution image to determine if the defect is present (can be detected) in the high resolution image. If the defect can be detected in the high resolution image, it is designated as an actual defect. If the defect cannot be detected in the high resolution image, it is designated as a nuisance defect.

Another embodiment of a system configured to generate a high resolution image for a specimen from one or more low resolution images of the specimen includes an imaging subsystem configured for generating one or more low resolution images of a specimen. The imaging subsystem may have any configuration described herein. The system also includes one or more computer subsystems, e.g., computer subsystem(s) 102 shown in FIG. 1, which may be configured as described further herein, and one or more components, e.g., component(s) 100, executed by the one or more computer subsystems, which may include any of the component(s) described herein. The component(s) include a model, e.g., model 104, which may be configured as described herein. For example, the model includes one or more first layers configured for generating a representation of the one or more low resolution images and one or more second layers configured for generating a high resolution image for the specimen from the representation of the one or more low resolution images. The one or more first and one or more second layers may be configured as described further herein. This system embodiment may be further configured as described herein.

Each of the embodiments of each of the systems described above may be combined together into one single embodiment.

Another embodiment relates to a computer-implemented method for generating a high resolution image for a specimen from one or more low resolution images of the specimen. The method includes acquiring one or more low resolution images of a specimen. The method also includes generating a representation of the one or more low resolution images by inputting the one or more low resolution images into one or more first layers of a model. In addition, the method includes generating a high resolution image for the specimen based on the representation. Generating the high resolution image is performed by one or more second layers of the model. The acquiring, generating the representation, and generating the high resolution image are performed by one or more computer systems. One or more components are executed by the one or more computer systems, and the one or more components include the model.

Each of the steps of the method may be performed as described further herein. The method may also include any other step(s) that can be performed by the system, computer subsystem(s), and/or imaging systems or subsystems described herein. The one or more computer systems, the one or more components, and the model may be configured according to any of the embodiments described herein, e.g., computer subsystem(s) 102, component(s) 100, and model 104. In addition, the method described above may be performed by any of the system embodiments described herein.

Figure 7:
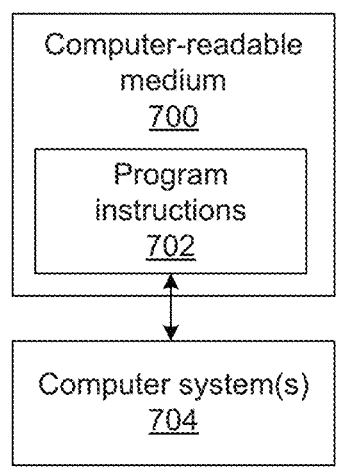
FIG. 7 is a block diagram illustrating one embodiment of a non-transitory computer-readable medium storing program instructions for causing one or more computer systems to perform a computer-implemented method described herein.

An additional embodiment relates to a non-transitory computer-readable medium storing program instructions executable on one or more computer systems for performing a computer-implemented method for generating a high resolution image for a specimen from one or more low resolution images of the specimen. One such embodiment is shown in FIG. 7. In particular, as shown in FIG. 7, non-transitory computer-readable medium 700 includes program instructions 702 executable on computer system(s) 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 704 may be configured according to any of the embodiments described herein.

Further modifications and alternative embodiments of various aspects of the invention will be apparent to those skilled in the art in view of this description. For example, methods and systems for generating a high resolution image for a specimen from one or more low resolution images of the specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to generate a high resolution image for a specimen from one or more low resolution images of the specimen, comprising:
   one or more computer subsystems configured for acquiring one or more low resolution images of a specimen; and
   one or more components executed by the one or more computer subsystems, wherein the one or more components comprise:
      a model, wherein the model comprises:
         one or more first layers configured for generating a representation of the one or more low resolution images; and
         one or more second layers configured for generating a high resolution image for the specimen from the representation of the one or more low resolution images, wherein the one or more low resolution images and the high resolution image have different image types, wherein the one or more low resolution images are generated by an optical based imaging system, wherein the optical based imagine system is configured to direct light to specimen and to detect light from the specimen due to illumination of the specimen by the optical based imagine system to thereby generate the one or more low resolution images, and wherein the high resolution image represents design data for the specimen or an image of the specimen generated by a high resolution electron beam system.

2. The system of claim 1, wherein the model is a deep learning model.

3. The system of claim 1, wherein the model is a machine learning model.

4. The system of claim 1, wherein the model is a generative model.

5. The system of claim 1, wherein the model is a neural network.

6. The system of claim 1, wherein the model is a convolution neural network.

7. The system of claim 1, wherein the one or more first layers comprise one or more convolutional and pooling layers followed by an encoder, and wherein the one or more second layers comprise a decoder followed by one or more convolutional and pooling layers.

8. The system of claim 7, wherein the representation of the one or more low resolution images generated by the one or more first layers comprises a compact representation of the one or more low resolution images.

9. The system of claim 1, wherein the one or more first layers comprise one or more first convolutional and pooling layers, and wherein the one or more second layers comprise one or more second convolutional and pooling layers.

10. The system of claim 1, wherein the one or more first layers comprise a discrete cosine transform layer, wherein the one or more first and second layers comprise a deep belief net, and wherein the one or more second layers comprise an inverse discrete cosine transform layer.

11. The system of claim 10, wherein the representation of the one or more low resolution images comprises a hidden representation generated by the deep belief net.

12. The system of claim 1, wherein the one or more low resolution images are generated with a single mode of the optical based imaging system.

13. The system of claim 1, wherein the one or more low resolution images are generated with multiple modes of the optical based imaging system.

14. The system of claim 1, wherein the one or more low resolution images are generated with multiple values for a focus parameter of the optical based imaging system.

15. The system of claim 1, wherein the one or more low resolution images are generated with multiple values for a spectral parameter of the optical based imaging system.

16. The system of claim 1, wherein the one or more low resolution images are generated with multiple values for a polarization parameter of the optical based imaging system.

17. The system of claim 1, wherein the one or more second layers are further configured for generating at least one additional high resolution image of the specimen from the representation of the one or more low resolution images, and wherein the high resolution image and the at least one additional high resolution image represent different images of the specimen generated by the high resolution electron beam system with different modes.

18. The system of claim 1, wherein the optical based imaging system is further configured as an inspection system.

19. The system of claim 1, wherein the specimen is a wafer.

20. The system of claim 1, wherein the specimen is a reticle.

21. The system of claim 1, wherein the one or more computer subsystems are further configured for verifying a defect detected in the one or more low resolution images, and wherein said verifying is performed using the high resolution image.

22. The system of claim 1, wherein the one or more computer subsystems are further configured for classifying a defect detected in the one or more low resolution images, and wherein said classifying is performed using the high resolution image.

23. The system of claim 1, wherein the one or more computer subsystems are further configured for detecting defects on the specimen based on a combination of the one or more low resolution images and the high resolution image.

24. A system configured to generate a high resolution image for a specimen from one or more low resolution images of the specimen, comprising:
  an imaging subsystem configured for generating one or more low resolution images of a specimen;
  one or more computer subsystems configured for acquiring the one or more low resolution images; and
  one or more components executed by the one or more computer subsystems, wherein the one or more components comprise:
    a model, wherein the model comprises:
      one or more first layers configured for generating a representation of the one or more low resolution images; and
      one or more second layers configured for generating a high resolution image for the specimen from the representation of the one or more low resolution images, wherein the one or more low resolution images and the high resolution image have different image types, wherein the imaging subsystem is further configured as an optical based imaging subsystem, wherein the optical based imaging subsystem is configured to direct light to specimen and to detect light from the specimen due to illumination of the specimen by the optical based imaging subsystem to thereby generate the one or more low resolution images, and wherein the high resolution image represents design data for the specimen or an image of the specimen generated by a high resolution electron beam system.

25. A non-transitory computer-readable medium, storing program instructions executable on one or more computer systems for performing a computer-implemented method for generating a high resolution image for a specimen from one or more low resolution images of the specimen, wherein the computer-implemented method comprises:
  acquiring one or more low resolution images of a specimen;
  generating a representation of the one or more low resolution images by inputting the one or more low resolution images into one or more first layers of a model; and
  generating a high resolution image for the specimen based on the representation, wherein generating the high resolution image is performed by one or more second layers of the model, wherein the one or more low resolution images and the high resolution image have different image types, wherein the one or more low resolution images are generated by an optical based imaging system, wherein the optical based imaging system is configured to direct light to specimen and to detect light from the specimen due to illumination of the specimen by the optical based imagine system to thereby generate the one or more low resolution images, wherein the high resolution image represents design data for the specimen or an image of the specimen generated by a high resolution electron beam system, wherein said acquiring, said generating the representation, and said generating the high resolution image are performed by one or more computer systems, wherein one or more components are executed by the one or more computer systems, and wherein the one or more components comprise the model.

26. A computer-implemented method for generating a high resolution image for a specimen from one or more low resolution images of the specimen, comprising:
  acquiring one or more low resolution images of a specimen;
  generating a representation of the one or more low resolution images by inputting the one or more low resolution images into one or more first layers of a model; and
  generating a high resolution image for the specimen based on the representation, wherein generating the high resolution image is performed by one or more second layers of the model, wherein the one or more low resolution images and the high resolution image have different image types, wherein the one or more low resolution images are generated by an optical based imaging system, wherein the optical based imaging system is configured to direct light to specimen and to detect light from the specimen due to illumination of the specimen by the optical based imaging system to thereby generate the one or more low resolution images, wherein the high resolution image represents design data for the specimen or an image of the specimen generated by a high resolution electron beam system, wherein said acquiring, said generating the representation, and said generating the high resolution image are performed by one or more computer systems, wherein one or more components are executed by the one or more computer systems, and wherein the one or more components comprise the model.

27. A system configured to generate a high resolution image for a specimen from one or more low resolution images of the specimen, comprising:
  one or more computer subsystems configured for acquiring one or more low resolution images of a specimen; and
  one or more components executed by the one or more computer subsystems, wherein the one or more components comprise:
    a model, wherein the model comprises:
      one or more first layers configured for generating a representation of the one or more low resolution images; and
      one or more second layers configured for generating a high resolution image for the specimen from the representation of the one or more low resolution images, wherein the one or more low resolution images and the high resolution image have different image types, wherein the one or more low resolution images are generated by an electron beam based imaging system, wherein the high resolution image represents design data for the specimen, and wherein the design data is information and data that is available prior to printing of the design on any physical specimens.

* * * * *